(12) United States Patent
Guibene et al.

(10) Patent No.: US 10,367,754 B2
(45) Date of Patent: Jul. 30, 2019

(54) SHARING DUTY CYCLE BETWEEN DEVICES

(71) Applicant: Intel Corporation, Santa Clara, CA (US)

(72) Inventors: Wael Guibene, Lexlip (IE); Mark Kelly, Leixlip (IE)

(73) Assignee: Intel Corporation, Santa Clara, CA (US)

( * ) Notice: Subject to any disclaimer, the term of this patent is extended or adjusted under 35 U.S.C. 154(b) by 220 days.

(21) Appl. No.: 15/200,473

(22) Filed: Jul. 1, 2016

(65) Prior Publication Data
US 2018/0006961 A1 Jan. 4, 2018

(51) Int. Cl.
| | | |
|---|---|---|
| *H04L 12/911* | (2013.01) | |
| *H04L 29/08* | (2006.01) | |
| *H04W 4/70* | (2018.01) | |
| *H04W 4/80* | (2018.01) | |
| *H04W 76/14* | (2018.01) | |
| *H04W 84/18* | (2009.01) | |

(52) U.S. Cl.
CPC .............. *H04L 47/70* (2013.01); *H04L 67/10* (2013.01); *H04L 67/12* (2013.01); *H04W 4/70* (2018.02); *H04W 4/80* (2018.02); *H04W 76/14* (2018.02); *H04W 84/18* (2013.01)

(58) Field of Classification Search
CPC .......... H04L 2012/5608; H04W 84/12; H04W 88/08; H04W 80/04; H04W 88/06; H04W 84/18; H04W 74/08
USPC ......... 370/310.2, 328, 338, 395.5, 331, 235, 370/237
See application file for complete search history.

(56) References Cited

U.S. PATENT DOCUMENTS

| | | | |
|---|---|---|---|
| 8,774,035 B1 | 7/2014 | Vivanco et al. | |
| 9,001,787 B1 | 4/2015 | Conant et al. | |
| 2005/0171662 A1* | 8/2005 | Strege | G01B 21/26 701/31.4 |
| 2010/0039986 A1* | 2/2010 | Jones | H04L 67/24 370/328 |
| 2011/0070906 A1* | 3/2011 | Chami | H04L 45/22 455/507 |
| 2012/0185569 A1* | 7/2012 | Das | H04L 67/12 709/219 |
| 2013/0122910 A1* | 5/2013 | Singh | H04W 36/18 455/437 |
| 2015/0195759 A1* | 7/2015 | Sirotkin | H04W 8/005 370/331 |

(Continued)

FOREIGN PATENT DOCUMENTS

KR      20160010850 A       1/2016

OTHER PUBLICATIONS

PCT International Search Report, PCT Application No. PCT/US2017/034672, dated Aug. 28, 2017, 3 pages.

*Primary Examiner* — Brenda H Pham
(74) *Attorney, Agent, or Firm* — International IP Law Group, P.L.L.C.

(57) ABSTRACT

A method and apparatus for offloading data from a device with a duty cycle shortage to a device with an excess of duty cycle are provided. In an example method, a packet is sent to a cloud device. A duty cycle usage remaining for transmission of data to the cloud device is calculated. If the remaining duty cycle is below a preset limit, data is offloaded to a sending device.

25 Claims, 7 Drawing Sheets

(56) References Cited

U.S. PATENT DOCUMENTS

| | | | |
|---|---|---|---|
| 2015/0215832 A1* | 7/2015 | Fitzpatrick | H04W 48/18 455/426.1 |
| 2015/0280995 A1 | 10/2015 | Centoza et al. | |
| 2016/0095060 A1* | 3/2016 | Seddighrad | H04W 52/0225 370/311 |
| 2016/0119434 A1 | 4/2016 | Dong et al. | |
| 2017/0307694 A1* | 10/2017 | Matsumura | G01S 19/42 |

* cited by examiner

100

400

500

SHARING DUTY CYCLE BETWEEN DEVICES

TECHNICAL FIELD

The present techniques relate generally to Internet of Things (IoT) devices. More specifically the present techniques relate to devices that can share transmission bandwidth.

BACKGROUND

It has been estimated that the Internet of Things (IoT) may bring Internet connectivity to 50 billion devices by 2020. For organizations, IoT devices may provide opportunities for monitoring and tracking other devices and items, including IoT devices and other devices. Communications with the devices will often use low bandwidth communications that are license free, but limited to a particular duty cycle, for example, limiting the total communication time that may be used during a certain period. The limitations on duty cycle and bandwidth may lead to the loss of data from IoT devices.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The internet of things (IoT) is a concept in which a large number of computing devices are interconnected to each other and to the Internet to provide functionality and data acquisition at very low levels. For example, IoT networks may include commercial and home automation devices, such as water distribution systems, electric power distribution systems, pipeline control systems, plant control systems, light switches, thermostats, locks, cameras, alarms, motion sensors, and the like. These devices, termed IoT devices herein, may be accessible through remote computers, servers, and other systems, for example, to control systems or access data. Further, IoT devices may utilize low power wide area (LPWA) communications, and similar systems, to communicate with cloud applications. LPWA networks may use any number of protocols, such as the LoRaWAN® 1.0 specification, promulgated by the LoRa® alliance.

LPWA technologies and communications may use sub-GHz radio frequency communications that are license-exempt. These may include frequencies in the industrial, scientific and medical (ISM) bands. However, these bands are often limited in duty cycle by regulations that will allow, depending on the band used, only 0.1%, 1%, or a maximum 10% over the air packets may be allowed over the course of a day. For some applications, this may be too short of transmission time to communicate the data, especially if an occurrence has led to an increased amount of data. Further, the crowded spectrum of ISM bands may result in a lossy RF environment leading to a high packet loss.

The techniques described herein may help in overcoming the duty-cycle limitations or highly lossy RF environment by offloading data to neighboring nodes in the network for transmission. As the LPWA time transmission is a limited resource, the offloading communications may be performed over a communications mesh, such as under the IEEE 802.15.4 standard, such as BTLE (blue tooth low energy), ZigBee®, or any number of other protocols. Other examples of IEEE 802.15.4 variants that may be used are described in IEEE 802.15.4g, and include LPWA systems. ZigBee® is an IoT communications standard promulgated by the ZigBee® Alliance. Using the techniques, a device may communicate nearly 100% of the time, achieving an increase up to about 99900% over the 0.1% regulation, about 9900% over the 1% regulation, and about 900% over the 10% regulation.

The techniques may also help devices experiencing lossy RF environment, e.g., with a high packet loss, improve their quality-of-service (QoS) by virtually transmitting over a better link in the mesh network. Thus, communications links may have a virtual improvement in the QoS.

Figure 1A:
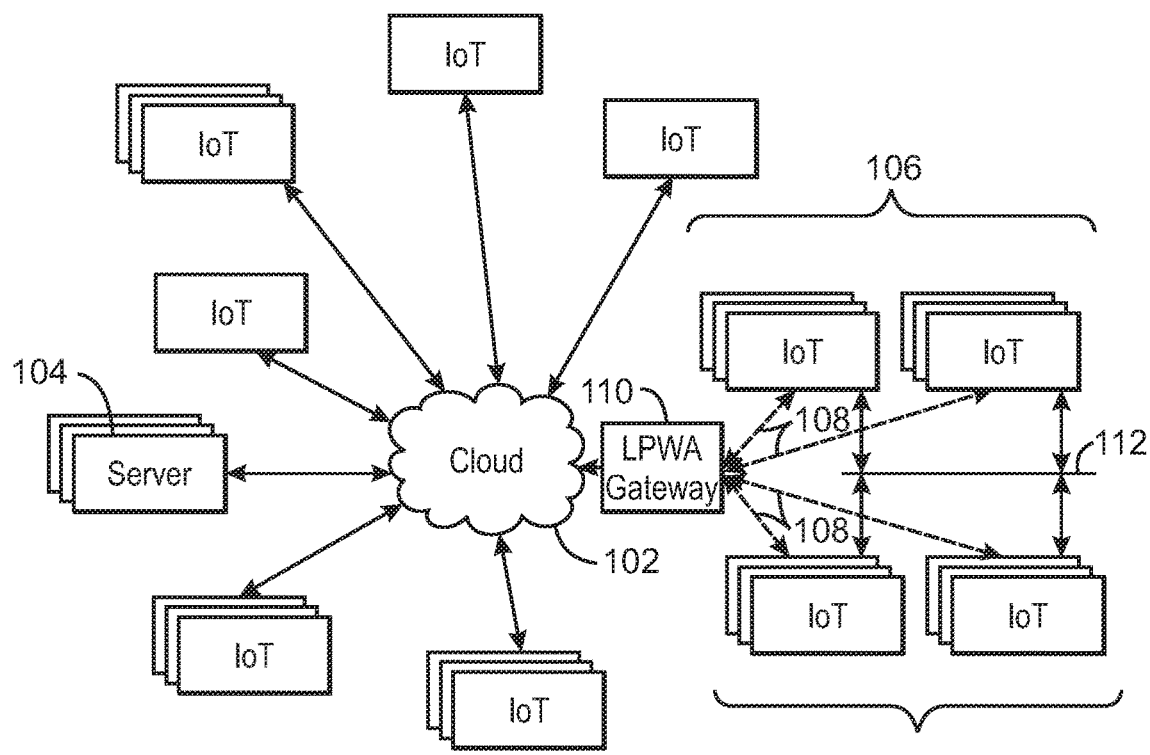
FIG. 1A is a drawing of a computing network including a computing cloud, in communication with a number of Internet of Things (IoT) devices.

FIG. 1A is a drawing of a computing network 100 including a computing cloud 102, in communication with a number of Internet of Things (IoT) devices. The IoT devices are labeled IoT in the figure. The cloud 102 may include a local area network (LAN), a wide area network (WAN), or the Internet. The cloud 102 may represent the Internet, or may be a wide area network, such as a proprietary network for a company. The IoT devices may include any number of different types of devices, grouped in various combinations. The IoT devices may include remote weather stations, integrated sensors, temperature sensors, security sensors, traffic flow monitors, cameras, and any number of other devices. The IoT devices may be communicating through the cloud 102 with a server 104, for example, to provide data to a user from an IoT device, inform them that an IoT device needs servicing, and the like.

The IoT devices may be clustered into functional groups that may communicate with each other and with devices in the cloud 102. For example, a group 106 of the IoT devices may communicate with the cloud 102 using LPWA links 108 to send data to an LPWA gateway 110. The LPWA gateway 110 can then send the data to the cloud 102 to be forwarded to the server 104. The IoT devices in the group 106 may be in communications with each other, for example, through a subnetwork 112. The subnetwork 112 may include a radio network, for example, as discussed with respect to FIG. 2, or may include an Ethernet or other type of wired network.

As described herein, each of the IoT devices in the group 106 may have a limited duty cycle for communications over the LPWA links 108. In some situations, this may lead to lowered communications, or even loss of data, from some of the IoT devices. For example, an IoT device monitoring a remote process may determine that the process has entered an alarm condition. The IoT device may increase communications to provide updates on the process parameter. However, the IoT device may reach a limit on the duty cycle, preventing it from sending data. As described herein, other IoT devices in the group 106 may share duty cycle, for example, receiving offloaded data from the duty cycle limited device over the subnetwork 112, and then transmitting the off loaded data over an LPWA link 108 as a sending device.

Figure 1B:
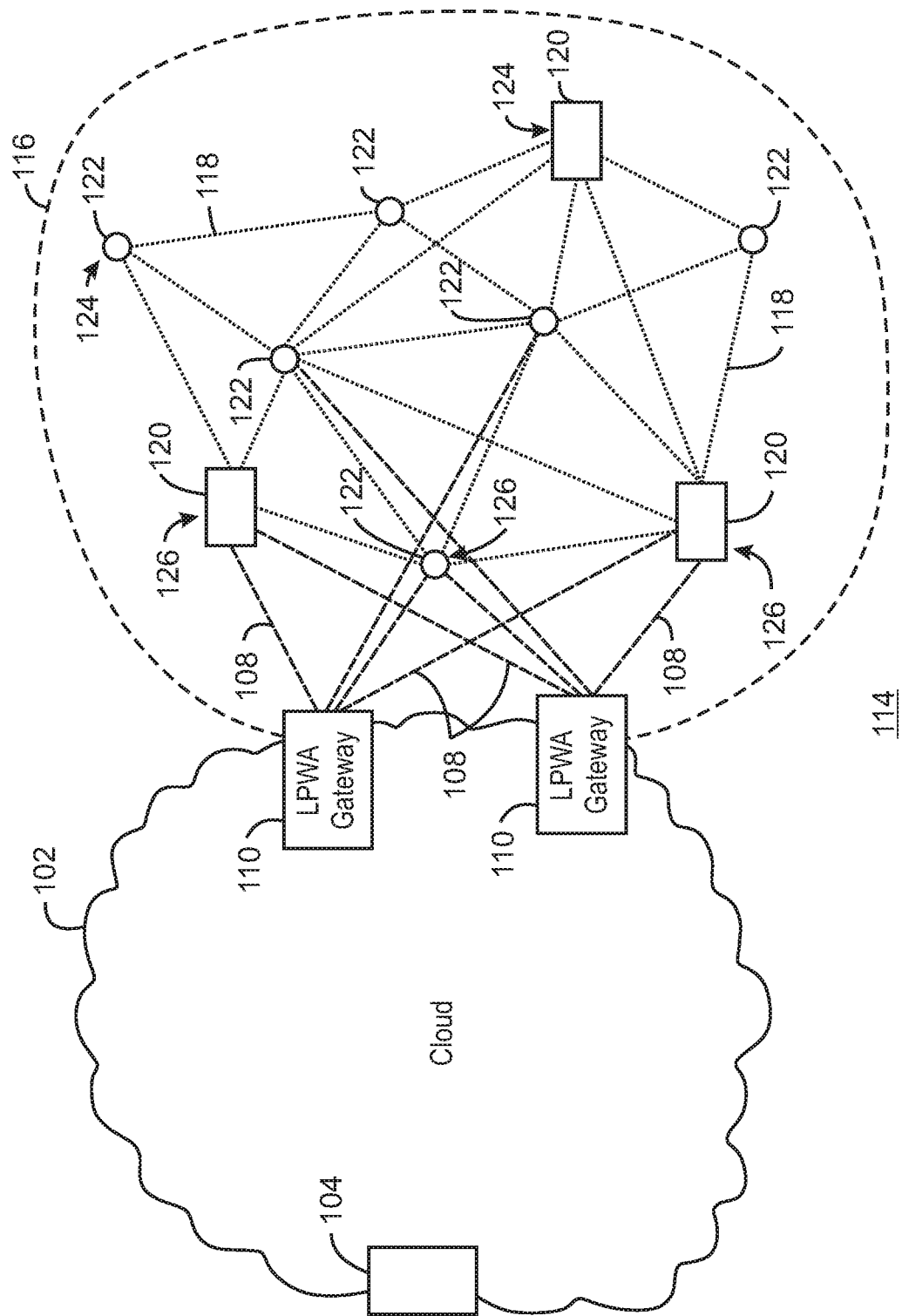
FIG. 1B is a drawing of a computing network including a computing cloud, in communication with a mesh network of IoT devices, which may be termed a fog, operating at the edge of the cloud.

FIG. 1B is a drawing of a computing network 114 including a computing cloud 102, in communication with a mesh network of IoT devices, which may be termed a fog 116, operating at the edge of the cloud 102. The fog 116 may be considered to be a massively interconnected network wherein a number of IoT devices are in communications with each other, for example, by radio links 118 (shown as dashed lines). This may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T-.M.A.N.), among others.

As described above, the IoT devices may communicate with the cloud 102 through LPWA gateways 110 using LPWA links 108 (shown as dotted lines). The LPWA gateways 110 are the edge devices that provide communications between the cloud 102 and the fog 116.

The fog 116 may include any number of different IoT devices. For example, two types of IoT devices are shown in the computing network 114 of FIG. 1B, data aggregators 120, and sensors 122. However, any combinations of IoT devices and functionality may be used. The data aggregators 120 may collect and process data from the sensors 122, providing local computing support and data storage in the fog 116. Further, the data aggregators 120 may add to the overall communications of the fog 116, adding LPWA capabilities that may be used when needed. The sensors 122 may provide the capability for interacting with an environment, for example, through environmental sensors and actuators. In some examples, the data aggregators 120 are omitted, and the sensors 122 handle all of the functions in the fog 116.

Each IoT device may include an LPWA communications system for sending communications to the LPWA gateways 110. However, IoT devices located farther from the LPWA gateways 110, such as devices 124 may have poor QoS for the LPWA communications, caused by the remoteness or by communications from other IoT devices in the fog 116. These devices 124 may offload communications to IoT devices that have a higher QoS for communications with the LPWA gateways 110, such as devices 126. Communications from any IoT device may be passed along the most convenient path or route between any of the IoT devices to reach IoT devices that can send the communications to the LPWA gateways 110. In these networks, the number of interconnections provide substantial redundancy, allowing communications to be maintained, even with the loss of a number of IoT devices.

The fog 116 of the IoT devices may be presented to devices in the cloud 102, such as a server 104, as a single device located at the edge of the cloud 102, for example, as a fog 116 device. In this example, the alerts coming from the fog 116 device may be sent without being identified as coming from a specific IoT device within the fog 116. For example, an alert may indicate that a process being monitored by the sensors 122 has exceeded operational limits, without identifying any specific one of the sensors 122 that sent the alert.

In some examples, the IoT devices may be configured using an imperative programming style, for example, with each IoT device having a specific function. However, the IoT devices forming the fog 116 device may be configured in a declarative programming style, allowing the IoT devices to reconfigure their operations and communications to determine the resources needed to respond to conditions, queries, and device failures. For example, a query from a user located at a server 104 about the location of an IoT device may result in the fog 116 device selecting the IoT devices, such as the LPWA gateways 110, data aggregators 120, or sensors 122, needed to answer the query.

The network is not limited to a single radio frequency for communications between IoT devices, but may use multiple frequencies to lower power demand. Further, communications by radio transceivers may combined with wired communications, for example, with some IoT devices communicating with others over Ethernet networks.

Figure 2:
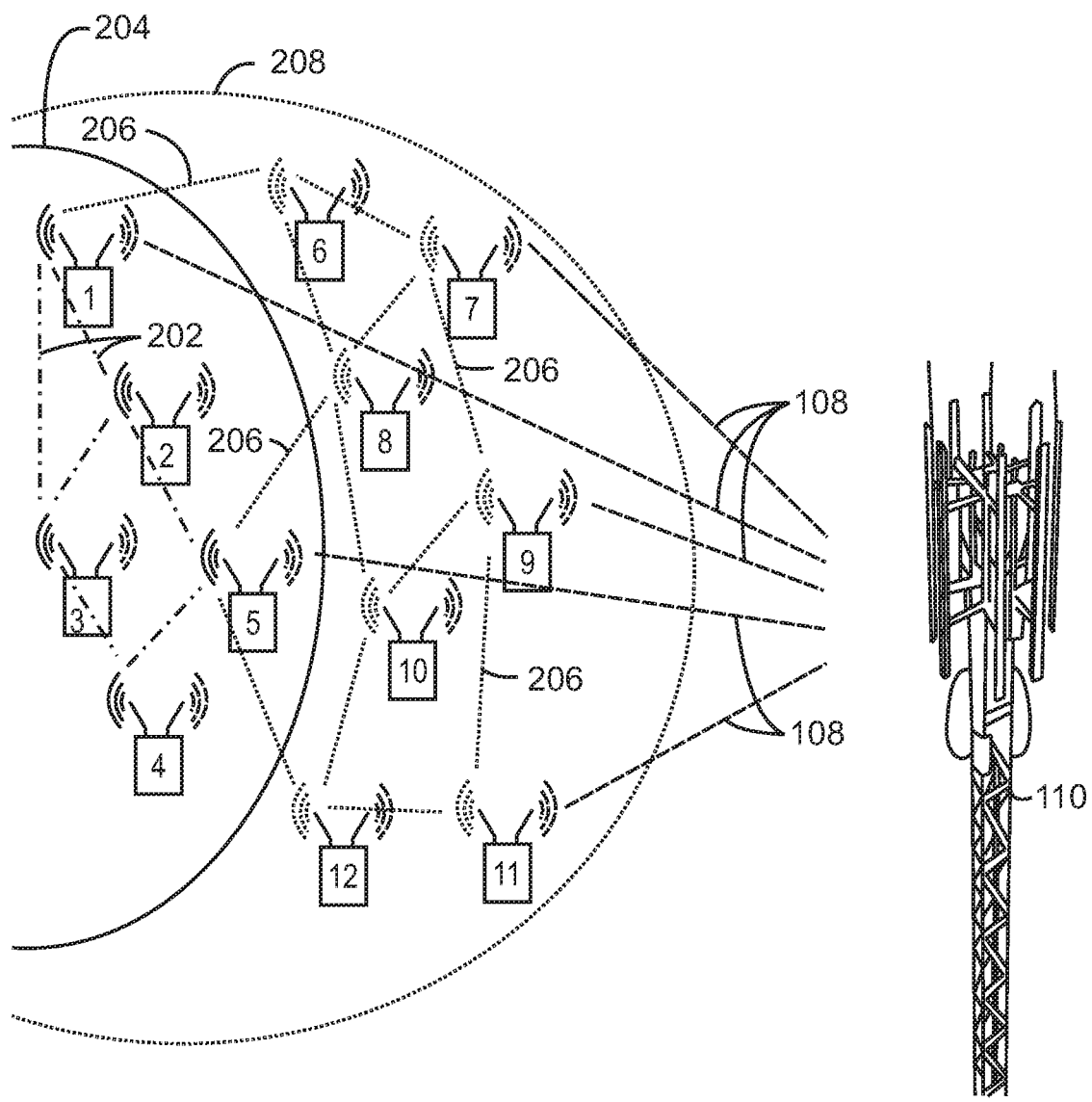
FIG. 2 is a schematic diagram of a mesh network in which IoT devices are sharing bandwidth for communication through a LPWA network.

FIG. 2 is a schematic diagram of a mesh network 200 in which IoT devices are sharing bandwidth for communication through a LPWA network. Like numbered items are as described with respect to FIGS. 1A and 1B. The topology is a star network and the IoT devices, labeled 1 to 12, are connected to the LPWA gateway 110 through LPWA links 108. As shown, the LPWA gateway 110 may be part of an LPWA infrastructure, or base-station, which is incorporated into a cell phone tower. Generally, each IoT device 1 to 12 transmits its data following the regulations of the country in which it operates. An example of these regulations is ETSI for Europe and FCC for North America.

In this example, IoT device 1 may be experiencing a very lossy RF environment and is not able to communicate its payload to the LPWA gateway 110. For example, IoT device 1 may be a sensor monitoring a tool in a fab or factory in which operations are temporarily interfering with communications, or may be a utility meter in the basement of a building that is near a construction site. The IoT device 1 may use a mesh interface to communicate with other devices, for example over a 2.4 GHz link. This may be a Bluetooth Low Energy (BTLE) link 202, used for communications between devices in a closer range 204, or a ZigBee link 206, for devices in a larger range 208.

The IoT device 1 may initiate communications with neighboring nodes, such as IoT devices 2, 3, and 6, to locate a node that has a better channel condition and available transmit duty-cycle, such as IoT device 9. IoT device 1 may then offload its communications to IoT device 9 through the mesh network. IoT device 9 may then transmit the data on behalf of IoT device 1 over a LPWA link 108. IoT device 9 may use a special packet format to indicate that the transmitted payload belongs to IoT device 1, for example, as described with respect to FIGS. 4 and 5.

Figure 3:
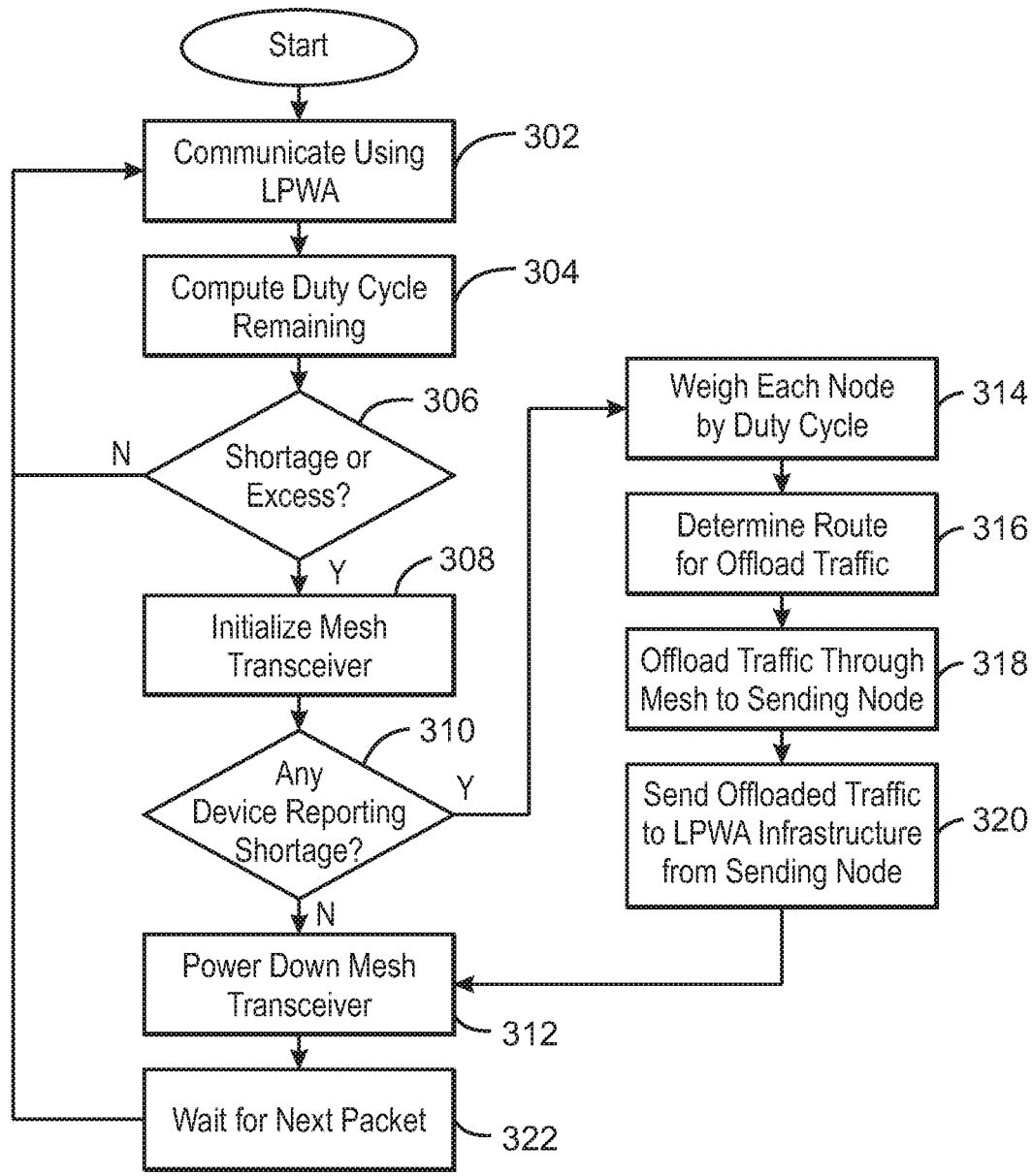
FIG. 3 is a block diagram of a method for sharing duty cycle between devices by offloading traffic from devices that have used up their duty cycle window to devices that have a remaining duty cycle window.

FIG. 3 is a block diagram of a method 300 for sharing duty cycle between devices by offloading traffic from devices that have used up their duty cycle window to devices that have a remaining duty cycle window. The method 300 starts at block 302 with a device communicating over an LPWA network. At block 304, the device computes how much time-on-air the frame sent used, and how much daily duty cycle it has left for further transmissions. The transmission (TX) duty cycle left for a given device (Device_ID) at a given timestamp n may be represented as $t_{Device\_ID}^n$.

At block 306, the term $t_{Device\_ID}^n$ is compared to duty cycle limits to determine if the device, Device_ID, is experiencing a shortage for the duty cycle (time on air resources) or it is a good candidate for sending another device's payload, for example, a node with enough power and enough $t_{Device\_ID}^n$ to handle off loaded traffic from another device. If either condition is met, at block 308, the device initializes a mesh transceiver and joins a newly initialized mesh network. If not, process flow returns to block 306.

At block 310, a determination is made as to whether any device is reporting a duty cycle shortage. If not, the mesh transceivers are powered down at block 312, and the mesh dissolves. If a device is reporting a shortage of duty cycle at block 310, process flow proceeds to block 314.

At block 314, each node, Device ID, is weighed in the mesh network with its $t_{Device\_ID}^n$, for routing purposes. At block 316, the nodes with TX duty cycle shortages will calculate each a route to the closest collaborating node such that:

$$Device\_ID^* = \max_{Device\_ID\ in\ MeshNW\_n} t_{Device\_ID}^n \bigg| \min_{Device\_ID} \#hops(DeviceShortage, Device\_ID)$$

Where Device_ID* is the ideal device to offload having the maximum $t_{Device\_ID}^n$ and minimizing the number of hops to the device in shortage of TX duty cycle. This is used to generate a route and an identifying pair (DeviceShortage, Device_ID*) for each device in shortage of TX duty cycle.

At block 318, the LPWA application payload is transferred over the mesh network from DeviceShortage to Device_ID*. At block 320, the offloaded traffic is then sent to the LPWA gateway by the sending node. Each device Device_ID* transmits the offloaded payload to the LPWA infrastructure on behalf of DeviceShortage over the LPWA network.

Figure 4:
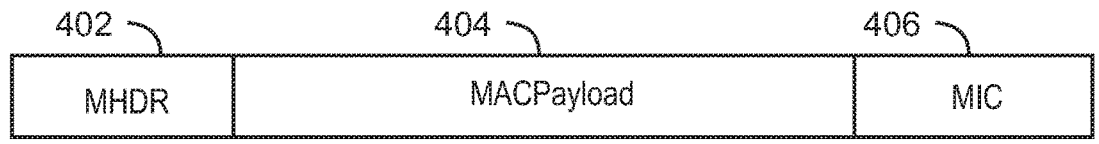
FIG. 4 is a media access control (MAC) frame structure that may be used for sending packets over an LPWA protocol, LoRaWAN.
Figure 5:
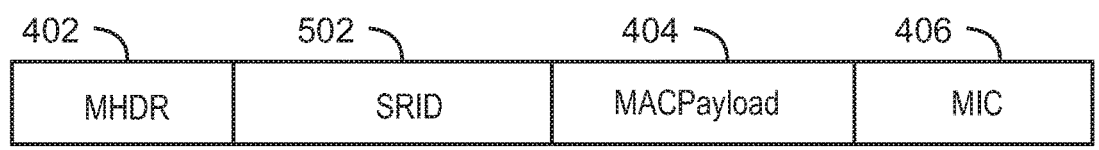
FIG. 5 is a MAC frame structure for sending offloaded data over a LoRaWAN connection.

It may be assumed that at this point that this frame may have a particular structure as described further with respect to FIGS. 4 and 5, which is different from the regular frames, recognized by the LPWA network as being transferred by Device_ID* on behalf of DeviceShortage.

Once the transfer of the LPWA payloads over the mesh network is completed, process flow returns to block 312, and all devices may power down their mesh interfaces. This may be performed prior to the completion of the LPWA transmission. In examples in which some or all of the devices have less limitations on power consumption, such as grid powered devices, the mesh transceivers may be left powered to maintain communications. Further, devices that are powered and coupled by a wired network may maintain network communications.

At block 322, the devices may wait for another packet to be sent over the LPWA network. Once a new packet is ready, process flow returns to block 302 to restart the process.

As described with respect to FIG. 4, the format of the frames used for transmitting the packets over the LPWA network during offloading phases may be adapted to identify the actual originating device for which the transmission is being sent. This section describes the frame structure of the LPWA frames used by Device_ID* to offload the applicative payload from DeviceShortage.

FIG. 4 is a media access control (MAC) frame structure that may be used for sending packets over the LPWA protocol, LoRaWAN®. The LoRaWAN specification, ver. 1.0, was promulgated by the LoRa® Alliance on Jun. 16, 2015. As shown in FIG. 4, the MAC frame structure 400 includes a MAC Header (MHDR) 402, a MAC payload 404, and a message integrity check (MIC) field 406. The MAC payload 404 includes the data, encrypted using a 128-bit in the advanced encryption standard coding (AES128). The message integrity check (MIC) field 406 provides a hash code of the payload to protect data integrity and authenticity. The MDHR 402 has the bit layout shown in Table 1.

TABLE 1

| Bit Layout in MDHR | | | |
|---|---|---|---|
| Bit Number | 7 . . . 5 | 4 . . . 2 | 1 . . . 0 |
| MDHR bits | MType | RFU | Major |

The fields that contain the Message Type (MType) or are reserved for future use (RFU) may be adapted to identify the sender. The bits in the field MType are defined as shown in Table 2.

TABLE 2

| Bit definitions for MType field | |
|---|---|
| MTypes | Description |
| 000 | Join Request |
| 001 | Join Accept |
| 010 | Unconfirmed Data Up |
| 011 | Unconfirmed Data Down |
| 100 | Confirmed Data Up |
| 101 | Confirmed Data Down |
| 110 | RFU |
| 111 | Proprietary |

In MType, the value "6" (110 in binary) is not attributed, so the protocol may be extended by the value "6" defined as "Offloaded Data Up", as the device is uploading an offloaded data from another device. The other targeted field may be the RFU bits. In the RFU bits, the default value is "000". The protocol may be extended by the value "001" meaning that the frame is offloaded from another device.

FIG. 5 is a MAC frame structure 500 for sending offloaded data over a LoRaWAN connection. In addition to the modified fields described with respect to FIG. 4, the MAC frame structure 500 will include a sender identification (SRID) field 502 for the originating source of the message: Device_ID. It can be noted that this is addition to the MHDR field in the frame header that identifies the device sending the data for any other devices.

Figure 6:
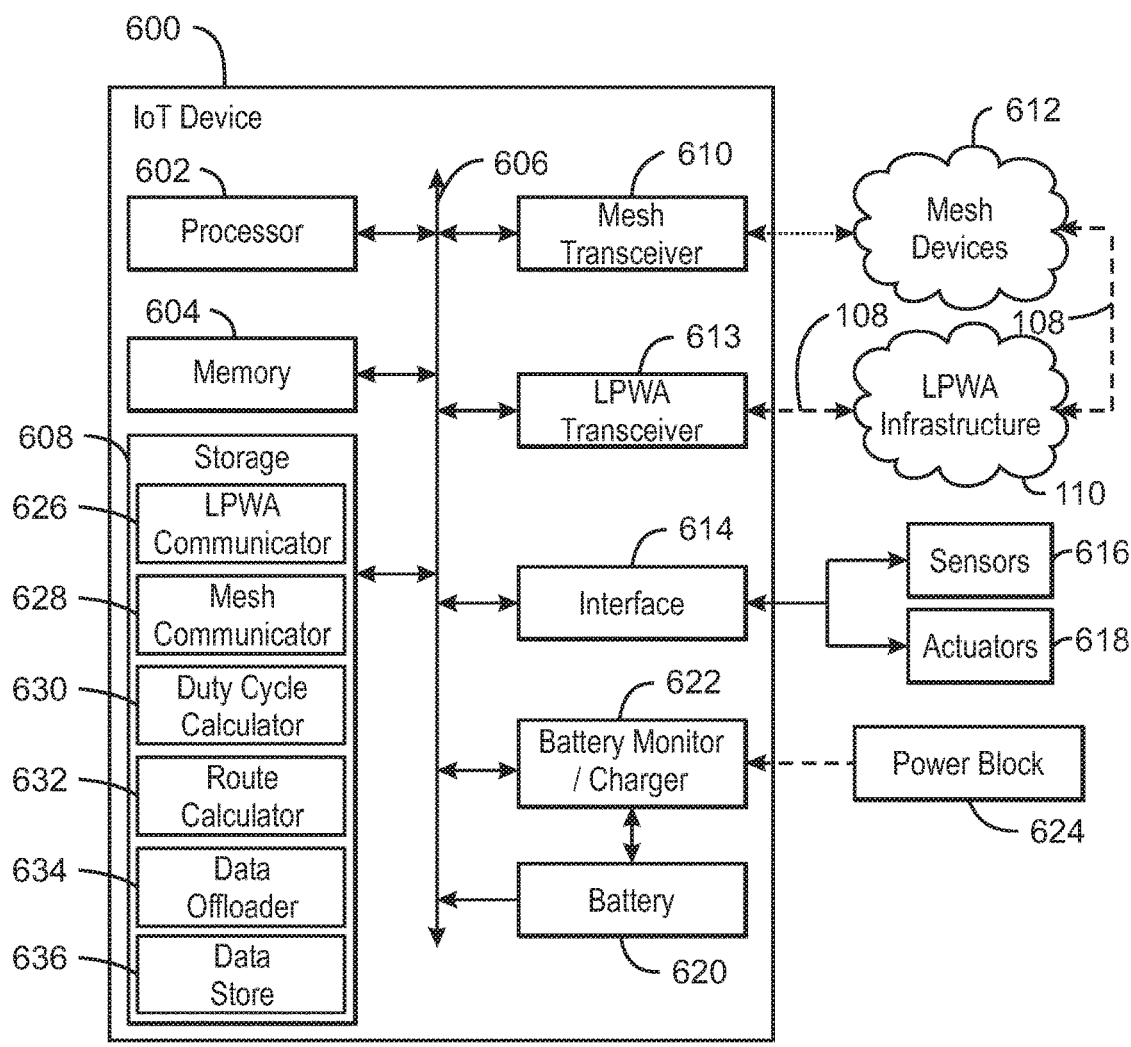
FIG. 6 is a block diagram of an example of components that may be present in an IoT device for offloading data.

FIG. 6 is a block diagram of an example of components that may be present in an IoT device 600 for offloading data. The IoT device 600 may include any combinations of the components shown in the example. The components may be implemented as ICs, portions thereof, discrete electronic devices, or other modules, logic, hardware, software, firmware, or a combination thereof adapted in the IoT device 600, or as components otherwise incorporated within a chassis of a larger system. The block diagram of FIG. 6 is intended to show a high level view of components of the IoT device 600. However, some of the components shown may be omitted, additional components may be present, and different arrangement of the components shown may occur in other implementations.

The IoT device 600 may include a processor 602, which may be a microprocessor, a multi-core processor, a multi-threaded processor, an ultra-low voltage processor, an embedded processor, or other known processing element. The processor 602 may be a part of a system on a chip (SoC) in which the processor 602 and other components are formed into a single integrated circuit, or a single package, such as the Edison™ or Galileo™ SoC boards from Intel. As an example, the processor 602 may include an Intel® Architecture Core™ based processor, such as a Quark™, an Atom™, an i3, an i5, an i7, or an MCU-class processor, or another such processor available from Intel® Corporation, Santa Clara, Calif. However, other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5/A6 processor from Apple® Inc., a Snapdragon™ processor from Qualcomm® Technologies, Inc., or an OMAP™ processor from Texas Instruments, Inc.

The processor 602 may communicate with a system memory 604 over a bus 606. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 608 may also couple to the processor 602 via the bus 606. To enable a thinner and lighter system design the mass storage 608 may be implemented via a solid state disk drive (SSDD). In low power implementations, the mass storage 608 may be on-die memory or registers associated with the processor 602. However, in some examples, the mass storage 608 may be implemented using a micro hard disk drive (HDD). Further, any number of new technologies may be used for the mass storage 608 in addition to, or instead of, the technologies described, such resistance change memories, phase change memories, holographic memories, or chemical memories, among others. For example, the IoT device 600 may incorporate the 3D XPOINT memories from Intel® and Micron®.

The components may communicate over the bus 606. The bus 606 may include any number of technologies, including industry standard architecture (ISA), extended ISA (EISA), peripheral component interconnects (PCI), peripheral component interconnect extended (PCIx), PCI express (PCIe), or any number of other technologies. The bus 606 may be a proprietary bus, for example, used in a SoC based system. Other bus systems may be included, such as an I²C interface, an SPI interface, and point to point interfaces, among others.

The bus 606 may couple the processor 602 to a mesh transceiver 610, for communications with other mesh devices 612. The mesh transceiver 610 may use any number of frequencies and protocols, such as 2.4 gigahertz (GHz) transmissions under the IEEE 802.15.4 standard, using the Bluetooth® low energy (BTLE) standard, as defined by the Bluetooth® Special Interest Group, or the ZigBee® standard, among others. Any number of radios, configured for a particular wireless communication protocol, may be used for the connections to the mesh devices 612. For example, a WLAN unit may be used to implement WiFi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 610 may communicate using multiple standards or radios for communications at different range. For example, the IoT device 600 may communicate with close devices, e.g., within about 10 meters, using a local transceiver based on BTLE, or another low power radio, to save power. More distant mesh devices 612, e.g., within about 50 meters, may be reached over ZigBee or other intermediate power radios. Both communications techniques may take place over a single radio at different power levels, or may take place over separate transceivers, for example, a local transceiver using BTLE and a separate mesh transceiver using ZigBee. The mesh transceiver 610 may be incorporated into an MCU as an address directly accessible by the chip, such as in the Curie® units available from Intel.

An LPWA transceiver 613 may be included to communicate with an LPWA gateway 110 over an LPWA link 108, for example, as a cloud transceiver. The LPWA transceiver 613 may follow the IEEE 802.15.4 and IEEE 802.15.4g standards, among others. As described with respect to FIGS. 4 and 5, the IoT device 600 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in IEEE 802.15.4e may be used.

The bus 606 may couple the processor 602 to an interface 614 that is used to connect external devices. The external devices may include sensors 616, such as accelerometers, level sensors, flow sensors, temperature sensors, pressure sensors, barometric pressure sensors, and the like. The interface 614 may be used to connect the IoT device 600 to actuators 618, such as power switches, valve actuators, or an alert system including an audible sound generator, a visual warning device, and the like.

While not shown, various input/output (I/O) devices may be present within, or connected to, the IoT device 600. For example, a display may be included to show information, such as sensor readings or actuator position. An input device, such as a touch screen or keypad may be included to accept input. Further, a network interface controller (NIC) may be present to provide a wired network connection to mesh devices 612.

A battery 620 may power the IoT device 600, although in examples in which the IoT device 600 is mounted in a fixed location, it may have a power supply coupled to an electrical grid. The battery 620 may be a lithium ion battery, a metal-air battery, such as a zinc-air battery, an aluminum-air battery, a lithium-air battery, and the like.

A battery monitor/charger 622 may be included in the IoT device 600 to track the state of charge (SoCh) of the battery 620. The battery monitor/charger 622 may be used to monitor other parameters of the battery 620 to provide failure predictions, such as the state of health (SoH) and the state of function (SoF) of the battery 620. The battery monitor/charger 622 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 622 may communicate the information on the battery 620 to the processor 602 over the bus 606. The battery monitor/charger 622 may also include an analog-to-digital (ADC) convertor that allows the processor 602 to directly monitor the voltage of the battery 620, or, with appropriate circuitry, the current flow from the battery 620. The battery parameters may be used to determine if the IoT device 600 should join a mesh network with other mesh devices 612.

A power block 624, or other power supply coupled to a grid, may be coupled with the battery monitor/charger 622 to charge the battery 620. In some examples, the power block 624 may be replaced with a wireless power receiver to obtain the power wirelessly, for example, through a loop antenna in the IoT device 600. A battery charging circuit, such as an LTC4020 chip from Linear Technologies of Milpitas, Calif., among others, may be included in the battery monitor/charger 622. The specific charging circuits chosen depend on the size of the battery 620, and thus, the current required. The charging may be performed using the Airfuel standard promulgated by the Airfuel Alliance, the Qi wireless charging standard promulgated by the Wireless Power Consortium, the Rezence charging standard, promulgated by the Alliance for Wireless Power, among others.

The mass storage 608 may include a number of modules to implement the data transfer functions described herein. These modules may include an LPWA communicator 626 that controls communications with the LPWA gateway, for example, through the LPWA transceiver 613. The LPWA communicator 626 may generate the appropriate frames, as discussed with respect to FIGS. 4 and 5, depending whether the IoT device 600 is the originator of the communications, or another mesh device 612 has offloaded data to the IoT device 600 for sending. A mesh communicator 628 may be used to communicate with other mesh devices 612, for example, through the mesh transceiver 610. The mesh communicator 628 may be used to receive offloaded data from other mesh devices 612 or to send data for offloading to other mesh devices 612.

A duty cycle calculator 630 may be used to track the remaining duty cycle for the time period. The duty cycle calculator 630 may be used to power up the mesh transceiver 610 for joining a mesh network, for example, when there is a shortage of remaining duty cycle for communications, for example, less than 25%, less than 10%, or less than 5%, depending on the amount of data to be sent in a transmission.

Further, the duty cycle calculator 630 may initiate the mesh transceiver 610 when there is an excess of remaining duty cycle that may be used for offloading transmissions from other mesh devices 612. The duty cycle calculator 630 may activate the mesh transceiver 610 and join the mesh network when the amount of duty cycle remaining is greater than a preset limit, for example, greater than about 50%, greater than about 75%, or greater than about 90%, depending on the amount of data to be used for transmissions. In this example, the duty cycle calculator 630 may not initiate the mesh transceiver 610 if the remaining battery life is below a threshold, for example, less than about 30%, less than about 20%, or less than about 10%, depending on the power demands of the mesh network communications and the LPWA communications.

A route calculator 632 may be used to determine which devices have sufficient capability for offloading data, and to calculate a shortest route over the network to those devices. In some examples, the route calculator 632 may also determine which types of mesh transceivers 610 to use to control overall power demand for the mesh network. For example, the route calculator 632 may calculate the power to be used for multiple hops over a low power communications channel, such as BTLE, versus fewer hops over a higher power communications channel, such as ZigBee, then select the route based on that additional consideration.

A data offloader 634 may be used to send data from the IoT device 600 to another mesh device 612 for forwarding to the LPWA gateway 110. The data offloader 634 may also be used to accept data from another mesh device 612, for example, when the IoT device 600 has sufficient duty cycle and battery life left. A data store 636 may hold the data for offloading from other devices, or data to be offloaded to other devices.

Figure 7:
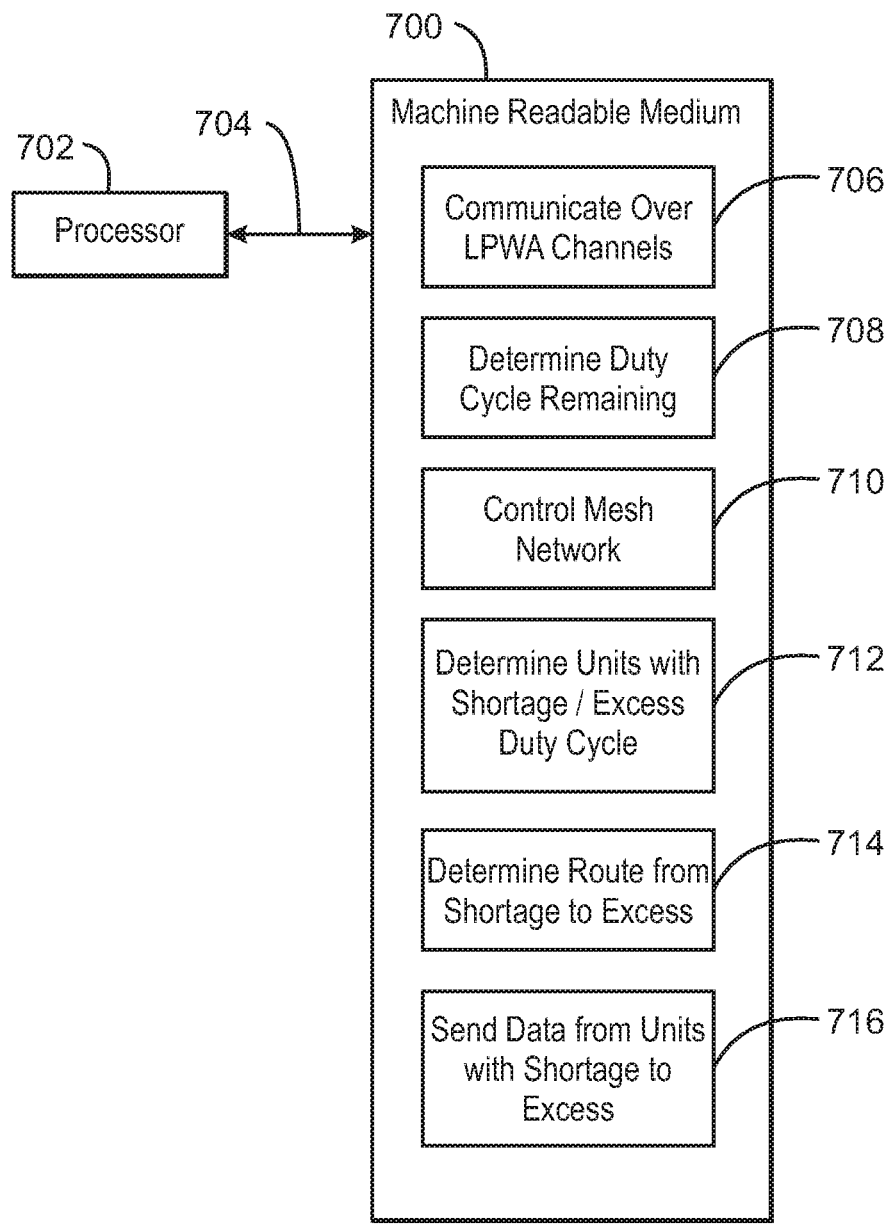
FIG. 7 is a block diagram of a non-transitory, machine readable medium including code to direct a processor to offload transmissions.

FIG. 7 is a block diagram of a non-transitory, machine readable medium 700 including code to direct a processor 702 to offload transmissions. The processor 702 may access the non-transitory, machine readable medium 700 over a bus 704. The processor 702 and bus 704 may be as described with respect to FIG. 6. The non-transitory, machine readable medium 700 may include devices described for the mass storage 608 of FIG. 6 or may include optical disks, thumb drives, or any number of other hardware devices.

The non-transitory, machine readable medium 700 may include code 706 to direct the processor 702 to communicate over LPWA channels, for example, formatting packets as described with respect to FIGS. 4 and 5, and then sending the packets over an LPWA transceiver to an LPWA gateway. Code 708 may be included to direct the processor 702 to calculate and track the amount of duty cycle remaining. Code 710 may be included to direct the processor 702 to initiate a mesh transceiver and control communications with a mesh network, for example, sending or receiving offloaded data. Code 712 may be included to direct the processor 702 to determine units, such as other mesh devices, that have a shortage or an excess of remaining duty cycle. Code 714 may be included to direct the processor 702 to determine a route from units with a shortage of duty cycle to units with an excess of duty cycle. Code 716 may also be included to direct the processor 702 to send data to units with an excess of duty cycle for forwarding to LPWA gateways. The code 716 sending the packets may receive acknowledgment packets from the sender to confirm than the packets have been received, and, if not, to resend the packets.

Example 1 includes an apparatus, including an Internet-of-things (IoT) device. The IoT device includes a cloud radio transceiver to send data to a cloud connection over a first frequency and a mesh transceiver to communicate with a mesh network over a second frequency. A duty cycle calculator determines if a duty cycle for transmissions from the cloud radio transceiver is nearing a limit. A data offloader sends data from the IoT device to a sending device in the mesh network mesh network capable of receiving the data and sending it on to the cloud connection.

Example 2 includes the subject matter of example 1. In this example, the IoT device includes a local transceiver to communicate with the mesh network, and the mesh transceiver and the local transceiver cover different ranges from the IoT device.

Example 3 includes the subject matter of either of examples 1 or 2. In this example, the mesh transceiver includes an IEEE 802.15.4 transceiver.

Example 4 includes the subject matter of any of examples 1 to 3. In this example, the local transceiver includes a Bluetooth low energy (BTLE) transceiver.

Example 5 includes the subject matter of any of examples 1 to 4. In this example, the cloud radio transceiver includes a low power wide area (LPWA) transceiver.

Example 6 includes the subject matter of any of examples 1 to 5. In this example, the apparatus includes a route calculator to calculate a shortest route from the IoT device to the sending device over the mesh network.

Example 7 includes the subject matter of any of examples 1 to 6. In this example, the apparatus includes a battery to power the IoT device.

Example 8 includes the subject matter of any of examples 1 to 7. In this example, the apparatus includes a battery monitor to determine a state of charge on a battery.

Example 9 includes the subject matter of any of examples 1 to 8. In this example, the duty cycle calculator is to activate the mesh communicator if the duty cycle remaining is greater than a preset limit and the state of charge of the battery is greater than a threshold.

Example 10 includes the subject matter of any of examples 1 to 9. In this example, the apparatus includes a network interface controller (NIC) to provide a wired network connection.

Example 11 includes the subject matter of any of examples 1 to 10. In this example, the apparatus includes an interface to couple the device to a sensor, and actuator, or both.

Example 12 includes a method for offloading data from an internet of things (IoT) device. The method includes sending a packet to a cloud device and computing a duty cycle usage remaining for transmission of data to the cloud device. If the remaining duty cycle is below a preset limit, data is offloaded to a sending device.

Example 13 includes the subject matter of example 12. In this example, the method includes computing the duty cycle usage remaining for transmission of data to the cloud device. If the remaining duty cycle is above a preset limit, offloaded data is accepted.

Example 14 includes the subject matter of either of examples 12 or 13. In this example, the method includes determining a charge on a battery. If the charge on the battery is below a threshold, a mesh transceiver is prevented from powering up.

Example 15 includes the subject matter of any of examples 12 to 14. In this example, the method includes initializing a mesh transceiver and determining if any device in a mesh network is reporting a shortage. If not the mesh transceiver is powered down.

Example 16 includes the subject matter of any of examples 12 to 15. In this example, the method includes weighting each device in a mesh network by remaining duty cycle and determining a route to the sending device in the mesh network. Data is then sent sending device over the mesh network.

Example 17 includes the subject matter of any of examples 12 to 16. In this example, the method includes sending data to a device in a first range using a low-power transmitter.

Example 18 includes the subject matter of any of examples 12 to 17. In this example, the method includes sending data to a device in a second range using an intermediate power transmitter.

Example 19 includes the subject matter of any of examples 12 to 18. In this example, the method includes determining a route to the sending device based, at least in part, on a power usage for the route.

Example 20 includes the subject matter of any of examples 12 to 19. In this example, the method includes powering down a mesh transceiver to lower power consumption.

Example 21 includes the subject matter of any of examples 12 to 20. In this example, the method includes formatting a packet to indicate an originating device for offloaded data.

Example 22 includes a non-transitory, machine readable medium, including instructions to direct a processor in an Internet of things (IoT) device to communicate over a low power wide area (LPWA) network, determine a remaining duty cycle for LPWA communications, and determine the remaining duty cycle for units in a mesh network. Instructions are included to direct the processor to send packets over the mesh network to a second device having an excess of duty cycle.

Example 23 includes the subject matter of example 22. In this example, the non-transitory, machine readable medium includes instructions to direct the processor to: determine if the IoT device has an excess of duty cycle and determine a charge on a battery is sufficient to support an offloading of data. If the IoT device has an excess of duty cycle and the charge on the battery is sufficient, instructions are included to direct the processor to accept offloaded data.

Example 24 includes the subject matter of either of examples 22 or 23. In this example, the non-transitory, machine readable medium includes instructions to direct the processor to determine a route over the mesh network from the IoT device to the second device.

Example 25 includes the subject matter of any of examples 22 to 24. In this example, the non-transitory, machine readable medium includes instructions to direct the processor to send data to the second device over the route.

Example 26 includes an apparatus, including an internet-of-things (IoT) device, that includes a cloud radio transceiver to send data to a cloud connection over a first frequency and a mesh transceiver to communicate with a mesh network over a second frequency. The IoT device includes a means for offloading data to a sending device once a duty cycle threshold has been reached.

Example 27 includes the subject matter of example 26. In this example, the IoT device includes a means for communicating at different distance ranges from the IoT device.

Example 28 includes the subject matter of either of examples 26 or 27. In this example, the apparatus includes a means for determining a route calculator to calculate a route from the IoT device to the sending device.

Example 29 includes the subject matter of any of examples 26 to 28. In this example, the apparatus includes a means to monitor and charge a battery.

Example 30 includes the subject matter of any of examples 26 to 29. In this example, the apparatus includes a means to determine when to activate a network communications system.

Example 31 includes an internet-of-things (IoT) device. The IoT device includes a cloud radio transceiver to send data to a cloud connection over a first frequency, a mesh transceiver to communicate with a mesh network over a second frequency, and a duty cycle calculator to determine if the duty cycle for transmissions from the cloud radio transceiver is nearing a limit. The IoT device includes a data offloader to send data from the IoT device to a sending device in the mesh network for the sending device to send on to the cloud connection.

Example 32 includes the subject matter of example 31. In this example, the IoT device includes a local transceiver to communicate with the mesh network. The mesh transceiver and the local transceiver cover different ranges from the IoT device.

Example 33 includes the subject matter of either of examples 31 or 32. In this example, the mesh transceiver includes a IEEE 802.15.4 transceiver.

Example 34 includes the subject matter of any of examples 31 to 33. In this example, the local transceiver includes a Bluetooth low energy (BTLE) transceiver.

Example 35 includes the subject matter of any of examples 31 to 34. In this example, the cloud radio transceiver includes a low power wide area (LPWA) transceiver.

Example 36 includes the subject matter of any of examples 31 to 35. In this example, the IoT device includes a route calculator to calculate a shortest route from the IoT device to the sending device over the mesh network.

Example 37 includes the subject matter of any of examples 31 to 36. In this example, the IoT device includes a battery to power the IoT device.

Example 38 includes the subject matter of any of examples 31 to 37. In this example, the IoT device includes a battery monitor to determine a state of charge on the battery.

Example 39 includes the subject matter of any of examples 31 to 38. In this example, the duty cycle calculator is to activate the mesh communicator if the duty cycle remaining is greater than a preset limit and the state of charge of the battery is greater than a threshold.

Example 40 includes the subject matter of any of examples 31 to 39. In this example, the IoT device includes a network interface controller (NIC) to provide a wired network connection.

Example 41 includes the subject matter of any of examples 31 to 40. In this example, the IoT device includes an interface to couple the device to a sensor, and actuator, or both.

Example 42 includes an apparatus including means to perform a method as described in any one of examples 12 to 21.

Example 43 includes a machine-readable storage including machine-readable instructions, when executed, to implement a method as described in any one of examples 12 to 21.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus, comprising an internet-of-things (IoT) device, comprising:
   a cloud radio transceiver to send data to a cloud connection over a first frequency;
   a mesh transceiver to communicate with a mesh network over a second frequency;
   a duty cycle calculator to determine if a duty cycle for transmissions from the cloud radio transceiver is nearing a limit, wherein the duty cycle calculator is to activate the mesh transceiver if the duty cycle remaining is greater than a preset limit and a state of charge of a battery to power the IoT device is greater than a threshold; and a data offloader to send data from the IoT device to a sending device in the mesh network capable of receiving the data and sending the data on to the cloud connection.

2. The apparatus of claim 1, wherein the IoT device comprises a local transceiver to communicate with the mesh network, and wherein the mesh transceiver and the local transceiver cover different ranges from the IoT device.

3. The apparatus of claim 2, wherein the mesh transceiver comprises a IEEE 802.15.4 transceiver.

4. The apparatus of claim 2, wherein the local transceiver comprises a Bluetooth low energy (BTLE) transceiver.

5. The apparatus of claim 1, wherein the cloud radio transceiver comprises a low power wide area (LPWA) transceiver.

6. The apparatus of claim 1, comprising a route calculator to calculate a shortest route from the IoT device to the sending device over the mesh network.

7. The apparatus of claim 1, comprising the battery to power the IoT device.

8. The apparatus of claim 7, comprising a battery monitor to determine the state of charge on the battery.

9. The apparatus of claim 1, comprising a network interface controller (NIC) to provide a wired network connection.

10. The apparatus of claim 1, comprising an interface to couple the IoT device to a sensor, and actuator, or both.

11. The apparatus of claim 1, the duty cycle calculator to determine if any device in the mesh network is reporting a duty cycle shortage, and, if not, to power down the mesh transceiver.

12. A method for offloading data from an internet of things (IoT) device, comprising:
sending a packet to a cloud device;
computing a duty cycle usage remaining for transmission of data to the cloud device;
activating a mesh transceiver if the remaining duty cycle is greater than a preset upper limit and a state of charge of a battery to power the IoT device is greater than a threshold; and
if the remaining duty cycle is below a preset lower limit, offloading data to a sending device.

13. The method of claim 12, comprising:
computing the duty cycle usage remaining for transmission of data to the cloud device; and, if the remaining duty cycle is above the preset upper limit,
accepting offloaded data.

14. The method of claim 13, comprising:
determining a charge on the battery; and, if the charge on the battery is below a threshold,
preventing the mesh transceiver from powering up.

15. The method of claim 12, comprising:
initializing a mesh transceiver; and
determining if any device in a mesh network is reporting a duty cycle shortage; and, if not,
powering down the mesh transceiver.

16. The method of claim 12, comprising:
weighting each device in a mesh network by remaining duty cycle;
determining a route to the sending device in the mesh network; and
sending data to the sending device over the mesh network.

17. The method of claim 16, comprising sending the data to a device in a first range using a low-power transmitter.

18. The method of claim 16, comprising sending the data to a device in a second range using an intermediate power transmitter.

19. The method of claim 16, comprising determining the route to the sending device based, at least in part, on a power usage for the route.

20. The method of claim 16, comprising powering down a mesh transceiver to lower power consumption.

21. The method of claim 16, comprising formatting a packet to indicate an originating device for offloaded data.

22. A non-transitory machine readable medium, comprising instructions, which when executed, direct a processor in an internet of things (IoT) device to:
communicate over a low power wide area (LPWA) network;
determine a remaining duty cycle for LPWA communications;
determine the remaining duty cycle for units in a mesh network;
send packets over the mesh network to a second device having an excess of duty cycle;
determine if the IoT device has an excess of duty cycle; and
if the IoT device has an excess of duty cycle and a charge of a battery is sufficient to allow offloading of data, allow offloading of data to the IoT device.

23. The non-transitory, machine readable medium of claim 22, comprising instructions, which when executed, direct the processor to determine a route over the mesh network from the IoT device to the second device.

24. The non-transitory, machine readable medium of claim 23, comprising instructions, which when executed, direct the processor to send data to the second device over the route.

25. The non-transitory machine readable medium of claim 22, comprising instructions, which when executed, direct the processor to determine if any device in the mesh network is reporting a duty cycle shortage, and, if not, to power down the mesh transceiver.

* * * * *